United States Patent
Keish et al.

(10) Patent No.: US 7,346,741 B1
(45) Date of Patent: Mar. 18, 2008

(54) MEMORY LATENCY OF PROCESSORS WITH CONFIGURABLE STRIDE BASED PRE-FETCHING TECHNIQUE

(75) Inventors: Brian F. Keish, San Jose, CA (US); Quinn Jacobson, Sunnyvale, CA (US); Lakshminarasim Varadadesikan, Bangalore (IN)

(73) Assignee: Sun Microsystems, Inc., Santa Clara, CA (US)

( * ) Notice: Subject to any disclaimer, the term of this patent is extended or adjusted under 35 U.S.C. 154(b) by 205 days.

(21) Appl. No.: 11/126,913

(22) Filed: May 10, 2005

(51) Int. Cl.
*G06F 13/00* (2006.01)

(52) U.S. Cl. ............. 711/137; 711/122; 711/125; 712/207

(58) Field of Classification Search ............. 711/137
See application file for complete search history.

(56) References Cited

U.S. PATENT DOCUMENTS

| | | | |
|---|---|---|---|
| 6,556,952 B1 * | 4/2003 | Magro ............. | 702/183 |
| 6,606,688 B1 * | 8/2003 | Koyanagi et al. ...... | 711/137 |
| 2003/0221069 A1 * | 11/2003 | Azevedo et al. ........ | 711/136 |
| 2004/0123043 A1 * | 6/2004 | Rotithor et al. ......... | 711/137 |
| 2005/0071572 A1 * | 3/2005 | Nakashima et al. ..... | 711/137 |
| 2006/0053256 A1 * | 3/2006 | Moyer et al. ........... | 711/137 |

* cited by examiner

*Primary Examiner*—Donald Sparks
*Assistant Examiner*—Chad L Davidson
(74) *Attorney, Agent, or Firm*—Hickman Palermo Truong & Becker LLP

(57) ABSTRACT

A method and apparatus for retrieving instructions to be processed by a microprocessor is provided. By pre-fetching instructions in anticipation of being requested, instead of waiting for the instructions to be requested, the latency involved in requesting instructions from higher levels of memory may be avoided. A pre-fetched line of instruction may be stored into a pre-fetch buffer residing on a microprocessor. The pre-fetch buffer may be used by the microprocessor as an alternate source from which to retrieve a requested instruction when the requested instruction is not stored within the first level cache. The particular line of instruction being pre-fetched may be identified based on a configurable stride value. The configurable stride value may be adjusted to maximize the likelihood that a requested instruction, not present in the first level cache, is present in the pre-fetch buffer. The configurable stride value may be updated manually or automatically.

12 Claims, 4 Drawing Sheets

MEMORY LATENCY OF PROCESSORS WITH CONFIGURABLE STRIDE BASED PRE-FETCHING TECHNIQUE

BACKGROUND

A microprocessor is a single chip (known as an integrated circuit or "IC") that is designed to perform arithmetic and logic operations on values stored in registers. Typical microprocessor operations include adding, subtracting, comparing two numbers, and fetching numbers from one area to another. These operations are the result of a set of instructions that are read and processed by the microprocessor. For example, when a computer is turned on, the microprocessor of the computer is designed to retrieve a set of instructions from the basic input/output system (BIOS) that comes with the computer as part of its memory. After that, the microprocessor may read and process instructions from the BIOS, the operating system that the BIOS loads into computer memory, or an application program.

Each instruction may be referenced by an address. The microprocessor keeps track on which instruction the microprocessor is currently processing using a program counter, abbreviated as PC. A PC is a register in the control unit of the microprocessor that is used to keep track of the address of the current or next instruction, depending on how the microprocessor is implemented. Typically, the program counter is advanced to the next instruction, and then the current instruction is executed.

While the architecture of a microprocessor may differ from implementation to implementation, there are several features common to all microprocessors. A description of the common features found in most microprocessors is provided with reference to FIG. 1, which is a block diagram of an illustrative microprocessor according to one approach. As shown in FIG. 1, several components are involved in the operation of a microprocessor 100. A microprocessor 100 may comprise an instruction execution component 110, an instruction buffer 120, and memory, such as caches 130 and 132. In addition, a microprocessor 100 may interact with memory external to the microprocessor 100, such as main memory 140 and cache 134. A brief description of the operation of the components of FIG. 1 shall now be presented.

The instruction execution component 110 of a microprocessor processes the instructions read by the microprocessor. For simplicity, an instruction execution component 110 of a microprocessor 100 shall be referred to herein as the core 110.

A microprocessor 100 may also contain one or more instruction buffers, such as instruction buffer 120. An instruction buffer is a buffer that temporarily holds one or more instructions until another component of the microprocessor is ready to receive those instructions. For example, the microprocessor 100 may read an instruction from memory and transfer the instruction to the instruction buffer 120. The instruction buffer 120 holds instructions read from memory until the core 110 is ready to process those instructions.

The instructions read by the microprocessor 100 may initially be stored in main memory 140. To reduce the amount of time it takes the microprocessor 100 to read instructions, instructions may also be stored in a type of memory called a cache. Caches are designed to reduce the amount of time required to retrieve instructions from main memory 140. A microprocessor 100 may have more than one cache, and caches may reside on the microprocessor (such as cache 130 and 132) or off the microprocessor (such as cache 134).

When the core 110 needs to process a particular instruction for processing, the microprocessor 100 may initially attempt to load the instruction from the L1 (Level 1 or first level cache) cache 130. If the requested instruction is not in the L1 cache 130, then the microprocessor 100 attempts to obtain the instruction from the L2 (Level 2 or second level cache) cache 132. If the requested instruction is not in the L2 cache 132, then the microprocessor 100 attempts to obtain the instruction from the L3 (Level 3 or third level cache) cache 134. If the requested instruction is not in the L3 cache 134, then the microprocessor 100 attempts to obtain the instruction from main memory 140. In this way, the memory of the microprocessor 100 is arranged in a hierarchy. The microprocessor initially checks the lowest level of the memory hierarchy (the L1 cache 130), and if the requested instructions is not found, the microprocessor 100 checks each higher level of memory, in order, for the requested instruction, until the instruction is located.

Typically, a lower level of memory is faster to access than a higher level of memory, but the lower level of memory can store fewer instructions than a higher level of memory. To illustrate, in a typical implementation, (a) the L3 cache 134 can store fewer instructions than main memory 140, but the microprocessor 100 can access the L3 cache 134 faster than main memory 140, (b) the L2 cache 132 can store fewer instructions than the L3 cache 134, but the microprocessor 100 can access the L2 cache 132 faster than the L3 cache 134, and (c) the L1 cache 130 can store fewer instructions than the L2 cache 132, but the microprocessor 100 can access the L1 cache 130 faster than the L2 cache 132.

Individual instructions may be stored in a set of instructions referred to as a line of instructions. For example, a line of instructions may comprise 8 individual instructions. A line of instructions is typically stored in a continuous portion of memory. In some implementations, instructions buffers and memory (such as main memory and the various caches accessed by a microprocessor) may store instructions in units of lines of instructions, rather than individual instructions. Thus, instead of storing an individual instruction into a cache, an entire line of instructions may be stored into the cache. In practice, when a individual instruction is needed for processing by the core, and the instruction needs to be retrieved from higher levels of memory since it is not stored within the L1 cache 130, the entire line of instructions containing the individual instruction, rather than simply the individual instruction, is retrieved from higher levels of memory and stored within the L1 cache 130.

It is advantageous to avoid retrieving instructions from higher levels of memory due to the latency involved in requesting instructions from higher levels of memory. Consequently, what is needed is an approach for retrieving instructions from memory that minimizes requesting instructions from higher levels of memory. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Techniques are described herein for retrieving instructions to be processed by a microprocessor. When a requested instruction is not present within the first level cache of a microprocessor, a line of instructions (other than the line of instructions containing the currently requested instruction) is requested in anticipation of being requested. In other words, the line of instructions is "pre-fetched." By pre-fetching instructions in anticipation of their future use, the latency involved in requesting the pre-fetched instructions from higher levels of memory may be minimized.

In an embodiment, a pre-fetched line of instruction may be stored into a pre-fetch buffer residing on a microprocessor. The pre-fetch buffer may be used by the microprocessor as an alternate source from which to retrieve a requested instruction when the requested instruction is not stored within the first level cache. When a particular instruction is needed, pre-fetching the particular instruction may enable the pre-fetched instruction to be retrieved from the pre-fetch buffer in less time than waiting to issue a request for the particular instruction only after it is determined that the particular instruction is needed and not stored within the first level cache.

A configurable stride value may be used to determine which line of instructions to pre-fetch. In this way, the configurable stride value may be adjusted to ensure that the particular line of instructions being pre-fetched is likely to be requested. The configurable stride may be adjusted manually or automatically. Various characteristics of the microprocessor may be monitored for use in adjusting or tuning the configurable stride value.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION OF EMBODIMENT(S)

Figure 1:
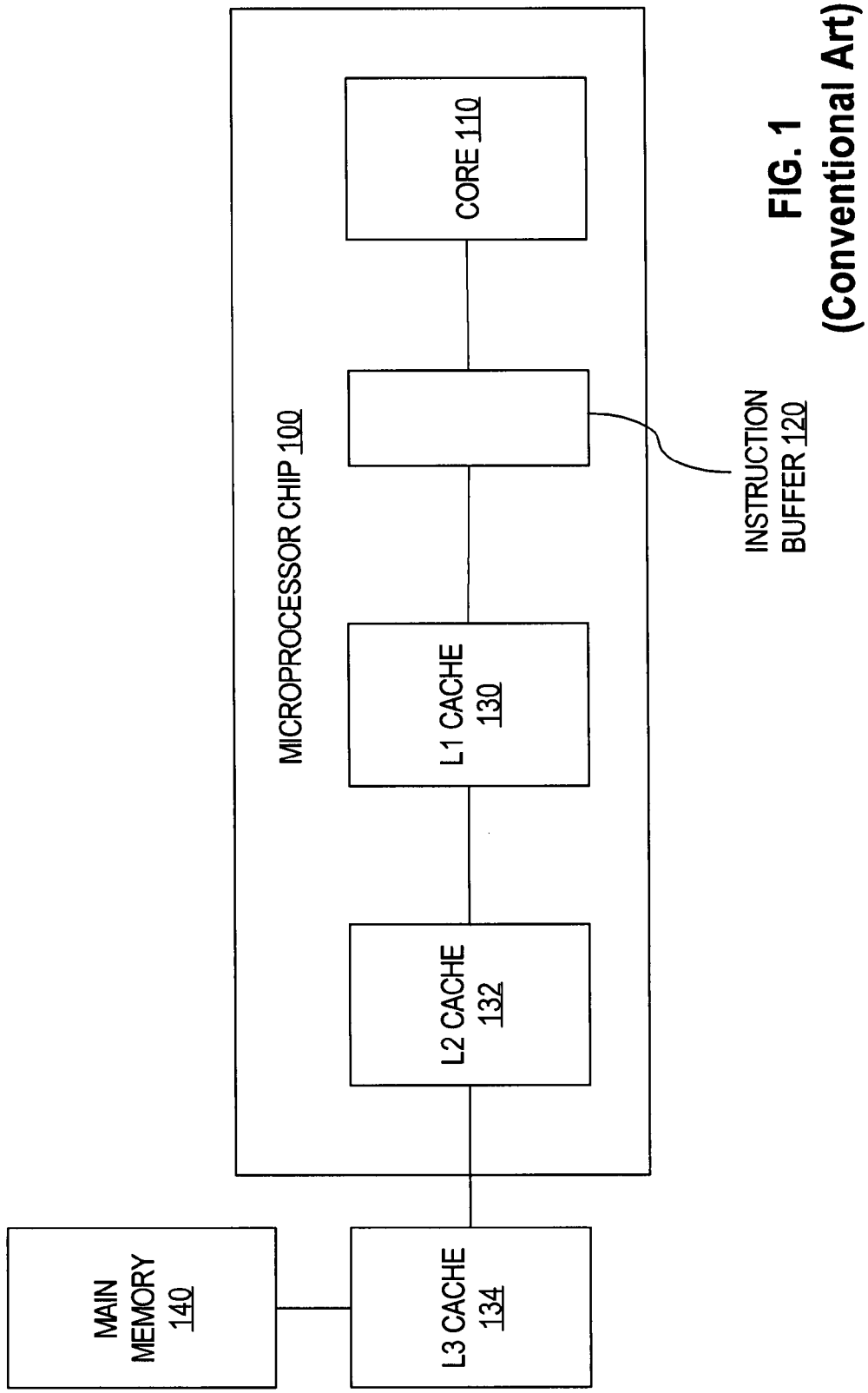
FIG. 1 is a block diagram of an illustrative microprocessor according to an approach.

In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Conceptual Overview

The amount of time required to retrieve instructions from memory may be measured in terms of actual latency and perceived latency. Actual latency refers to the amount of time required to actually retrieve a requested instruction from memory. Perceived latency refers to the amount of time from an explicit request for an instruction until when the instruction is retrieved from memory.

Embodiments of the invention operate under the recognition that by retrieving and storing instructions in anticipation of being requested, instead of waiting for the instructions to be requested, the perceived latency involved in requesting instructions from higher levels of memory may be minimized. Retrieving an instruction (or line of instructions) in anticipation of being requested in the future is referred to as "pre-fetching" an instruction (or line of instructions). To avoid confusion, a "normal" request for an instruction, that is, a non-pre-fetched request issued to retrieve an instruction for processing by the core, shall be referred to herein as an explicit request.

A pre-fetched line of instructions may be stored into a pre-fetch buffer. The pre-fetch buffer may be used by a microprocessor as an alternate source from which to retrieve a requested instruction when the requested instruction is not stored within the first level cache. When a particular instruction is needed, pre-fetching the particular instruction may enable the pre-fetched instruction to be retrieved from the pre-fetch buffer in less time than waiting to issue an explicit request for the particular instruction only after it is determined that the particular instruction is needed and not stored within the first level cache. Advantageously, the latency of retrieving the requested instruction from a higher level of memory (such as the second level cache) may be avoided when the microprocessor is able to obtain the requested instruction from the pre-fetch buffer.

Generally, instructions are processed by the core of a microprocessor in an order corresponding to the their address. For example, a first instruction may be requested, and then a second instruction having an address adjacent to the first instruction may be requested, and so on. In this way, a line of instructions that is currently being requested often has an address that is slightly after the address of a line of instructions that was recently requested. The pre-fetching techniques described herein take advantage of this generalization by storing a pre-fetched line of instruction, whose address is slightly ahead of the currently requested line of instruction, into the pre-fetch buffer in the hope that the pre-fetched line of instruction may be requested in the future. Thus, pre-fetching techniques may be less advantageous when the instruction path is not sequential, such as when the instruction path jumps to another instruction whose address is remote to the prior instruction.

Figure 2:
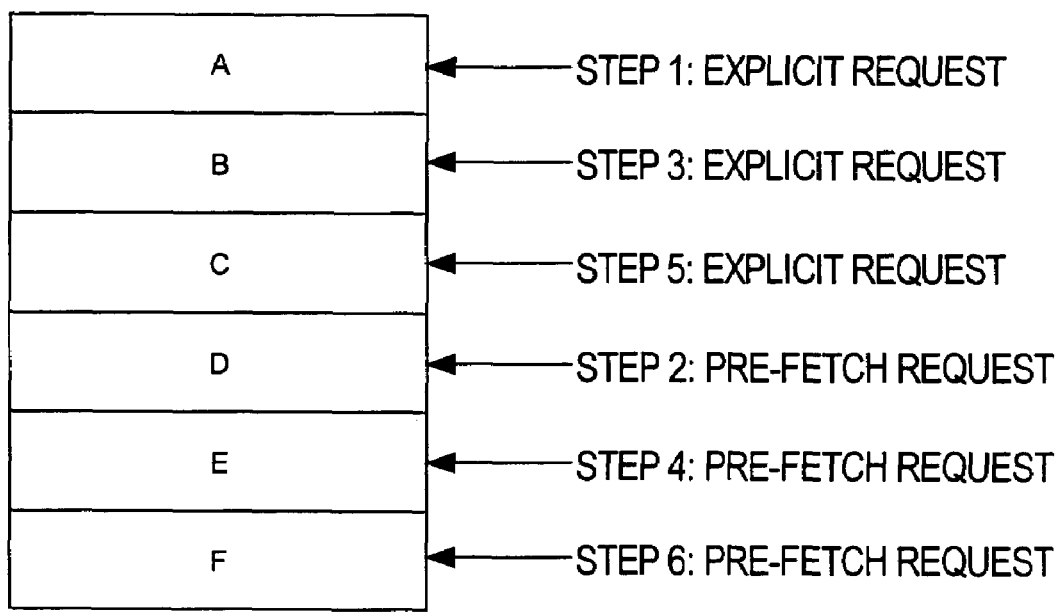
FIG. 2 is a block diagram of a sequence of lines of instructions according to an embodiment of the invention.

To illustrate the advantages of pre-fetching instructions, consider FIG. 2, which is a block diagram of a sequence of lines of instructions according to an embodiment of the invention. FIG. 2 depicts a series of 6 lines of instructions, each labeled in sequence A-F. The addresses of the lines of instructions of FIG. 2 are sequential, i.e., the address of line of instructions A is next to the address of line of instructions B, and so on. An explanation of how the lines of instructions may be requested according to an embodiment of the invention follows. To facilitate the below explanation, assume that (a) instructions in each of the lines of instructions depicted in FIG. 2 will be executed in sequence (i.e., no jumps or loops), (b) each of the lines of instructions depicted in FIG. 2 need to be stored in the first level cache to supply instructions to the core, and (c) none of the lines of instructions depicted in FIG. 2 are stored in the first level cache.

According to an embodiment, in step 1, an instruction in line of instructions A needs to processed by the core of the microprocessor. The microprocessor attempts to retrieve the needed instruction from the first level cache. However, since line of instructions A is not present in the first level cache, it follows that the needed instruction is not in the first level cache. The microprocessor issues an explicit request to retrieve line of instructions A from alternate sources. For example, as explained below, the microprocessor first tries to retrieve line of instructions A from the pre-fetch buffer, and if that fails, from higher levels of memory. When line of instructions A is eventually obtained, it is stored in the first level cache.

Contemporaneously with issuing the explicit request for line of instructions A, in step 2, the microprocessor also issues a pre-fetch request for line of instructions D. Line of instructions D is not currently needed for processing by the core, but it is anticipated that line of instructions D may be needed in the near future. When line of instructions D is eventually obtained, it will be stored in the pre-fetch buffer.

Thereafter, in step 3, the microprocessor needs to load line of instructions B into the first level cache, and issues an explicit request for line of instructions B to be stored into the first level cache. When line of instructions B is obtained, it will be stored in the first level cache. Contemporaneously with issuing the explicit request for line of instructions B, in step 4, the microprocessor also issues a pre-fetch request for line of instructions E. When line of instructions E is obtained, it will be stored in the pre-fetch buffer. In like manner, when the microprocessor needs to load line of instructions C into the first level cache in step 5, the microprocessor will issue an explicit request for line of instructions C to be stored into the first level cache. Contemporaneously with issuing the explicit request for line of instructions C, in step 6, the microprocessor also issues a pre-fetch request for line of instructions F. When line of instructions F is obtained, it will be stored in the pre-fetch buffer.

Importantly, when the core needs to process an instruction from line of instructions D, it is likely the pre-fetch request for line of instructions D will have been processed, and thus line of instructions D will have been stored in the pre-fetch buffer. Thus, even though the line of instructions D is not stored in the first level cache since an explicit request has not been issued for line of instructions D, line of instructions D is stored in the pre-fetch buffer. Advantageously, the microprocessor does not need to issue an explicit request for line of instructions D to the second level cache, as the microprocessor may retrieve the requested instruction from the line of instructions D stored in the pre-fetch buffer. In this way, the microprocessor does not need to obtain the requested instruction from higher levels of memory when they are stored within the pre-fetch buffer.

A configurable stride value may be used to determine which line of instructions to pre-fetch. In this way, the configurable stride value may be adjusted to ensure that the particular line of instructions being pre-fetched is likely to be requested in the near future.

The configurable stride value may indicate how many lines of instructions to skip from the mostly recently requested line of instructions. For example, in the above example involving FIG. 2, a pre-fetch request for line of instructions D was issued when line of instructions A was not present in the first level cache. Thus, the configurable stride value indicated that two lines of instructions should be skipped from the most recently requested line of instructions to determine which line of instructions to pre-fetch. Having provided a high-level overview of an embodiment of the invention, the architecture of an illustrative microprocessor having a pre-fetch buffer shall be described.

Architecture Overview

Figure 3:
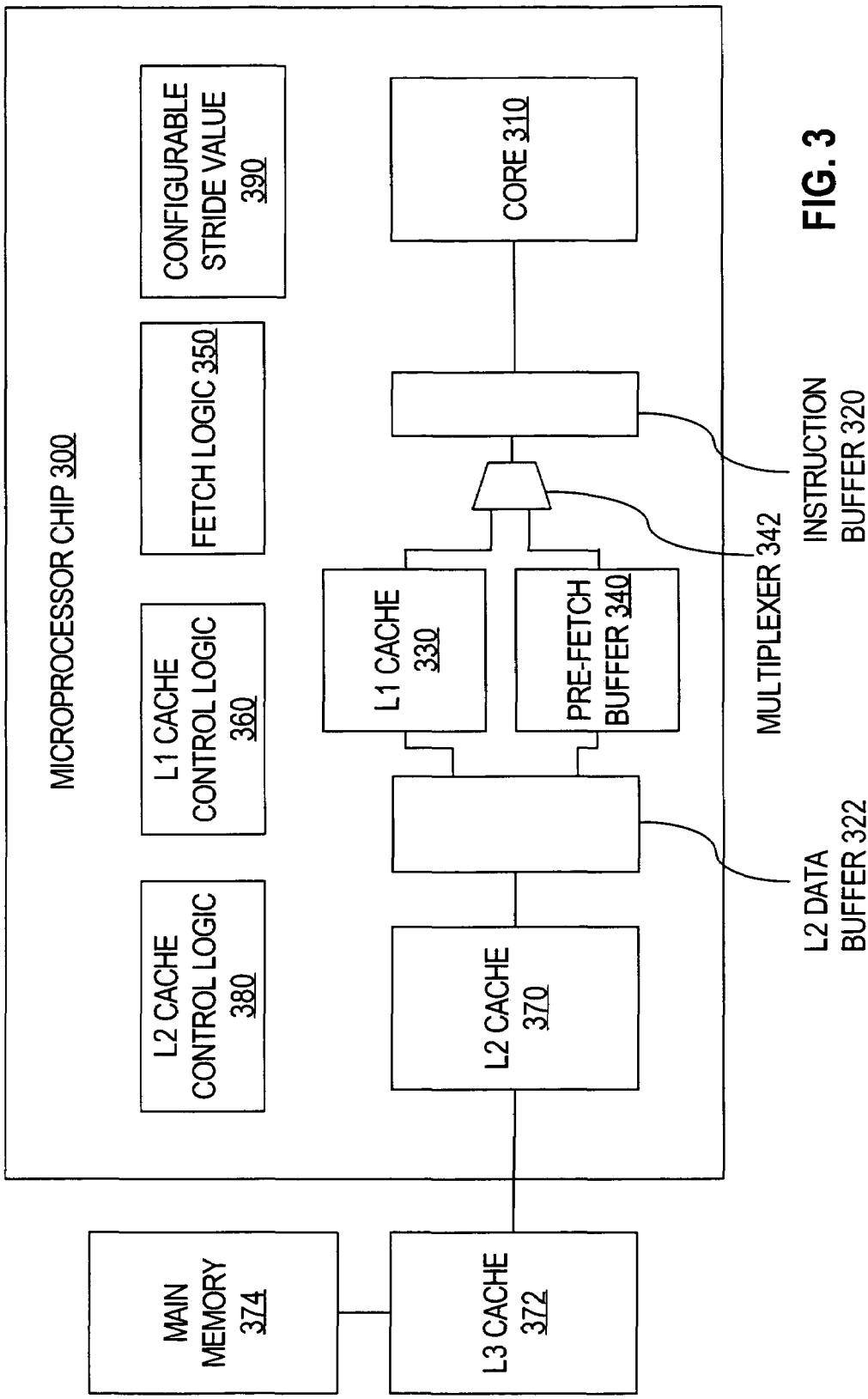
FIG. 3 is a block diagram of a microprocessor having a pre-fetch buffer according to an embodiment of the invention.

FIG. 3 is a block diagram of a microprocessor 300 having a pre-fetch buffer 340 according to an embodiment of the invention. The block diagram of FIG. 3 will be referenced below in the description of the steps of storing lines of instructions into the pre-fetch buffer 340 and retrieving requested instructions from the pre-fetch buffer 340. However, to provide context to the discussion of those steps, the components of the block diagram of FIG. 3 shall be briefly discussed below.

The core 310, the instruction buffer 320, and the L1 cache (or first level cache) 330 each operate as described above with respect to core 110, instruction buffer 120, and the L1 cache 130 respectively as described above. It should be noted, however, that different amounts of instructions may be loaded into the instruction buffer 320, depending on the implementation of the microprocessor 300. For ease of explanation, embodiments of the invention shall be explained with reference to loading a single instruction into the instruction buffer 320; however, other embodiments of the invention may load two or more instructions at a time into the instruction buffer 320. The L1 cache 330 may be implemented using a variety of addressing schemes, such as a 4-way set associative scheme.

The pre-fetch buffer 340 stores lines of instructions that have been pre-fetched. In other words, the instructions stored within the pre-fetch buffer 340 are anticipated of being requested in the future, but need not have been previously requested for processing by the core 310. The pre-fetch buffer 340 may be configured to store any number of lines of instructions. The pre-fetch buffer may also be implemented using a variety of addressing schemes, such direct mapping or 4-way set associative. As described below, in an embodiment of the invention, the pre-fetch buffer 340 is optional.

According to one embodiment of the invention, pre-fetch buffer 340 stores eight lines of instructions, and is implemented using a direct mapping scheme. In such an embodiment, advantageously, only three bits of an address of a particular instruction are needed to uniquely identify in which of the eight positions of the pre-fetch buffer 340 a line of instructions, containing the particular instruction, should be stored. For example, any three bits of the address of an instruction that are consistent across the entire line of instructions may be used, such as the last three bits of the index portion of the address of an instruction. To illustrate, if the last three bits of the index portion of the address of an instruction are "010," then this indicates that the line of instructions containing the instruction should be stored in third position of the pre-fetch buffer 340. Techniques for storing and retrieving lines of instructions using a direct mapping scheme are known to those skilled in the art.

Multiplexer 342 is used to facilitate the movement of instruction(s) from either the L1 cache 330 or the pre-fetch buffer 340 to the instruction buffer 320. Since a requested instruction, needed for processing by the core 310, is obtained from either the L1 cache 330 or the pre-fetch buffer 340, fetch logic 350 instructs the multiplexer 342 on whether the output of the multiplexer 342 should originate from the L1 cache 330 or the pre-fetch buffer 340.

Fetch logic 350 is responsible for determining which instruction is needed for processing by the core 310. For example, fetch logic 350 may access the PC to determine the address of the instruction needed for processing by the core 310. Fetch logic 350 is also responsible for fetching the needed instruction from the L1 cache 330 and the pre-fetch buffer 340.

L1 cache control logic 360 is responsible for detecting when an instruction is found within the L1 cache 330 or the pre-fetch buffer 340. In other words, the L1 cache control logic 360 detects cache "hits" and cache "misses" to the L1 cache 330 and to the pre-fetch buffer 340. When the L1 cache control logic 360 determines that a requested instruction is not found within the L1 cache 330, the L1 cache control logic 360 is responsible for issuing a pre-fetch instruction request to the L2 cache 370 for the requested instruction. Additionally, when the L1 cache control logic 360 determines that a requested instruction is not found within either the L1 cache 330 or the pre-fetch buffer 340, the L1 cache control logic 360 is responsible for issuing an explicit request to the L2 cache 370 for the line of instruction containing the requested instruction.

The L2 cache control logic 380 detects if a line of instructions being requested is not stored in the L2 cache. In essence, the L2 cache control logic 380 detects cache "hits" and cache "misses" to the L2 cache 370. If a cache miss is detected to the L2 cache 370, the L2 cache control logic 380 issues a request to a higher portion of memory for the requested line of instructions. For example, the L2 cache control logic 380 may issue a request to the L3 cache 372 for a requested line of instructions if the requested line of instructions is not stored in the L2 cache 372. Similarly, each level of memory has a similar set of control logic associated with it that detects cache hits and cache misses to the level of memory. Thus, even though it is not depicted in FIG. 3, if a requested line of instructions is not stored within the L3 cache 372, an L3 cache control logic component will detect whether an instruction being requested from the L3 cache 372 is not stored within the L3 cache, and will subsequently issue a request to main memory 374 for the requested line of instructions.

L2 data buffer 322 temporarily stores instructions, to be stored into either the L1 cache 330 or the pre-fetch buffer 340, that were loaded from higher levels of memory.

The L2 cache 370, L3 cache 372, and the main memory 374 operate as described above with respect to the L2 cache 132, L3 cache 134, and main memory 140 respectively.

The configurable stride value 390 may be stored in a register of the microprocessor 300. The purpose of the configurable stride value 390 is to indicate which line of instructions to retrieve when pre-fetching a line of instructions. The configurable stride value 390 may identify an integer used in identifying which line of instructions to pre-fetch. To illustrate, in one embodiment, the configurable stride value 390 indicates how many lines of instructions to skip from the most recently requested line of instructions. In another embodiment, the configurable stride value 390 indicates how many lines of instructions, in addition to a predetermined number (which may be positive or negative), to skip from the most recently requested line of instructions.

Having presented an illustrative architecture of a microprocessor having a pre-fetch buffer 340 according to an embodiment of the invention, the process of how lines of instructions are pre-fetched and stored in the pre-fetch buffer shall now be described in greater detail.

Retrieving Instructions Using the Configurable Stride Value

Figure 4:
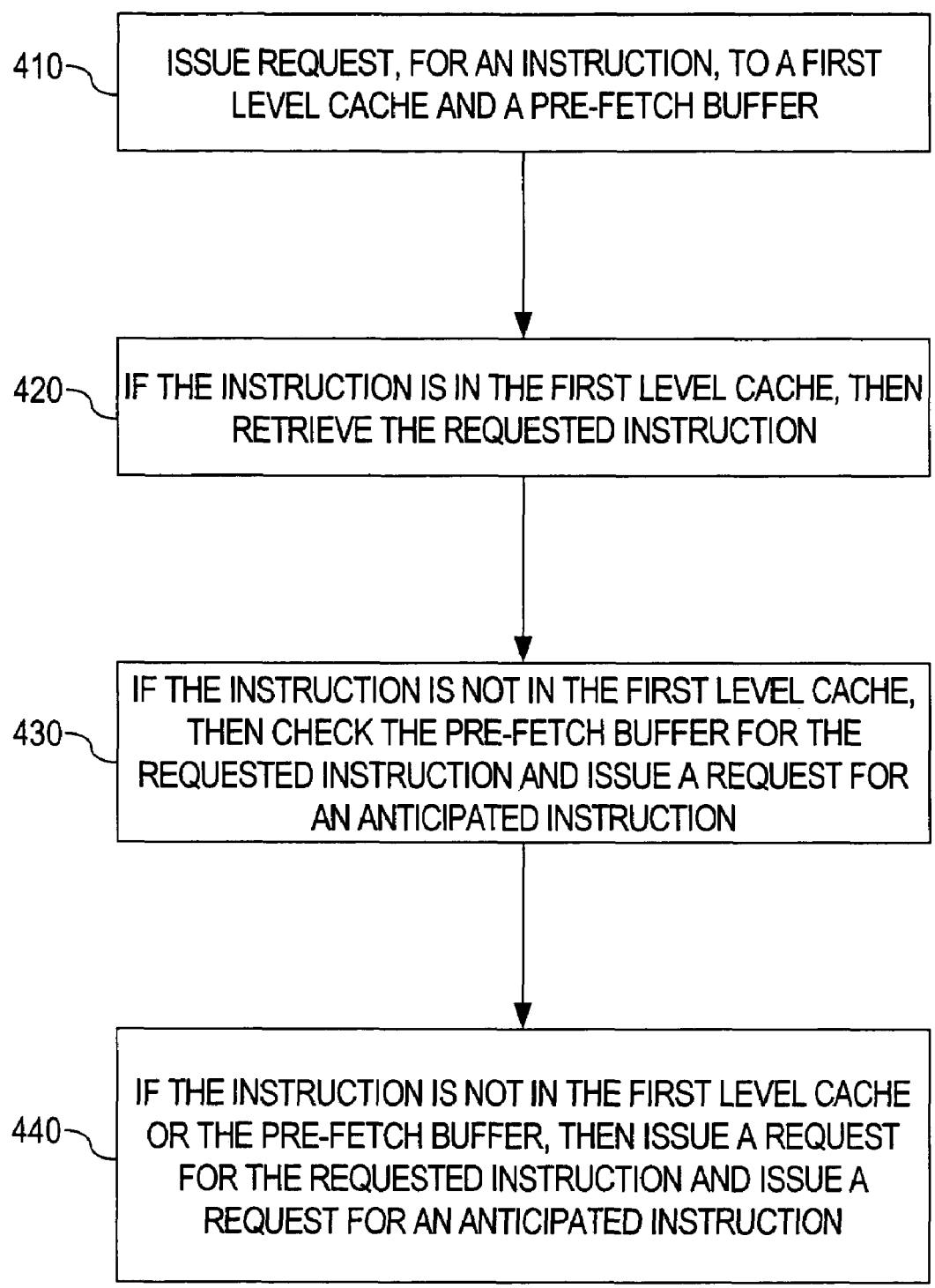
FIG. 4 is a flowchart illustrating the steps of retrieving instructions from a pre-fetch buffer according to an embodiment of the invention.

FIG. 4 is a flowchart illustrating the steps of retrieving instructions from a pre-fetch buffer according to an embodiment of the invention. The steps of FIG. 4 shall be explained below with reference to the illustrative microprocessor depicted in FIG. 3.

In step 410, fetch logic 350 issues a request for a particular instruction ("the current instruction") to be processed by the core 310 to the L1 cache 330 and the pre-fetch buffer 340. Fetch logic 350 may access the PC to determine the address of the current instruction needed for processing by the core 310. Fetch logic 350 may issue the request to the L1 cache 330 at the same time as issuing the request to the pre-fetch buffer 340.

For example, assume that the L1 cache 330 is implemented using a 4-way set associative scheme, and that the pre-fetch buffer 340 can store eight lines of instructions, and is implemented using a direct mapping scheme. The fetch logic 350 sends a message to the L1 cache 330. The message contains the index portion and the tag portion of the current instruction. The index portion of the current instruction may be used to identify a set of four lines of instructions in the L1 cache 330. The tag portion of the current instruction may be used to determine whether any of the four identified lines of instructions match the current instruction. Existing techniques known to those skilled in the art may be used to determine whether there current instruction exists in the L1 cache 330 based on the index portion and the tag portion of the current instruction.

Simultaneously, the fetch logic 350 also sends a message to the pre-fetch buffer 340. The message sent to the pre-fetch buffer 340 may contain a sequence of bits of the address of the current instruction to identify a particular position in the pre-fetch buffer 340. For example, the last three bits of the index portion of the address of the current instruction may be used by the fetch logic 350 to identify a particular position of the eight positions within the pre-fetch buffer. Once a position in the pre-fetch buffer 340 where the current instruction would be stored is identified, a determination can be made, by the fetch logic 350, as to whether the line of instruction in the identified position is the current instruction. Existing techniques known to those skilled in the art for determining whether an instruction within a cache using a direct mapping scheme may be used to determine whether the current instruction is stored in the pre-fetch buffer 340. After a request for the current instruction is sent to the L1 cache 330 and the pre-fetch buffer 340, processing proceeds to step 420.

In step 420, if the current instruction is stored within the L1 cache 330, then the current instruction is retrieved from the L1 cache 330. The fetch logic 350 may determine whether the current instruction is stored within the L1 cache 330. The fetch logic 350 may use existing techniques known the those skilled in the art to determine whether the current instruction in stored within the L1 cache 330, e.g., the fetch logic 350 may read the values of one or more registers storing the results of comparing the tag values of lines of instructions, stored in the L1 cache 330, that were identified by the index of the current instruction to the tag of the current instruction.

In response to determining that the current instruction is stored within the L1 cache 330, the fetch logic 350 (a) instructs the multiplexer 342 such that the output from the multiplexer 342 corresponds to the input from the L1 cache 330, rather than the pre-fetch buffer 340, and (b) loads the current instruction from the L1 cache 330 to the instruction buffer 320. Once the current instruction is loaded into the instruction buffer 320, the current instruction may be moved to the core 310 for processing.

In step 430, if the current instruction is not stored in the L1 cache 330, then the fetch logic 350 determines whether the current instruction is stored within the pre-fetch buffer 340. For example, if the pre-fetch buffer 340 is implemented using a direct mapping scheme, then the fetch logic 350 may use existing techniques known to those skilled in the art to determine whether the current instruction in stored within a cache using a direct mapping scheme, e.g., the fetch logic 350 may read the values of one or more registers storing the results of comparing the tag value of the identified line of instructions, stored in the pre-fetch buffer 340, that was identified by the sequence of bits of the current instruction to the tag value of the current instruction.

If the current instruction is stored within the pre-fetch buffer 340, then the fetch logic 350 moves the line of instructions containing the current instruction ("the moved line of instructions") from the pre-fetch buffer to the L1 cache 330. In this way, the next time the fetch logic 350 requests an instruction comprised within the moved line of instructions, the instruction may be obtained from the L1 cache 330. In an embodiment, a line of instructions is moved from the pre-fetch buffer 340 to the L1 cache 330 only if the line of instructions was not currently stored in the L1 cache 330.

Also, in response to determining that the current instruction is stored within the pre-fetch buffer 340, the fetch logic 350 (a) instructs the multiplexer 342 such that the output from the multiplexer 342 corresponds to the input from the pre-fetch buffer 340, and (b) loads the current instruction from the pre-fetch buffer 340 to the instruction buffer 320. Once the current instruction is loaded into the instruction buffer 320, the current instruction may be moved to the core 310 for processing. In addition, since the current instruction was not stored within the L1 cache 330, a pre-fetch request is made, as explained below.

Making a Pre-Fetch Instruction Request

Additionally, in step 430, a pre-fetch request for a line of instructions is made. In an embodiment, a pre-fetch request for a line of instructions is issued anytime that a requested instruction is not present within the L1 cache 330. The L1 cache control logic 360 may determine when a requested instruction is not present within the L1 cache 330. For example, the L1 cache control logic 360 may make this determination by accessing a register that stores information describing the result of comparing (a) the tag values of four lines of instructions identified by the index of the current instruction and (b) the tag value of the current instruction.

In an embodiment, the L1 cache control logic 360 makes a pre-fetch request for a line of instructions by first consulting the configurable stride value 390. If the configurable stride value 390 is stored within a register of the microprocessor 300, then the L1 cache control logic 360 consults the register storing the configurable stride value 390 to read the configurable stride value 390.

After reading the configurable stride value 390, the L1 cache control logic 360 determines which line of instructions to pre-fetch based, at least in part, on the configurable stride value 390. The L1 cache control logic 360 identifies the line of instructions ("the identified line of instruction") containing the current instruction being requested. The L1 cache control logic 360 may make this determination by accessing the PC to determine which line of instructions is associated with the value of the PC. The L1 cache control logic 360 may then identify which line of instructions to pre-fetch ("the pre-fetched line of instructions) by moving X number of lines of instructions ahead of the identified line of instructions, where X is an integer whose value corresponds to the configurable stride value. The relationship between the value of X and the configurable stride value is explained further below.

In an embodiment of the invention, the configurable stride value 390 may indicate how many lines of instructions to skip from the mostly recently requested line of instructions to identity which line of instructions to pre-fetch. For example, the configurable stride value 390 may be stored in a two-bit register. If a two-bit register has a value of two, then two lines of instructions are skipped from the mostly recently requested line of instruction to identify the line of instructions to pre-fetch. If the two-bit register has a value of three, then three lines of instructions are skipped from the most recently requested line of instruction to identify the line of instructions to pre-fetch.

Of course, the configurable stride value 390 may be used in a variety of ways to identify the particular line of instructions to pre-fetch. For example, in another embodiment, the configurable stride value 390 indicates how many lines of instructions, in addition to a predetermined number (which may be positive or negative), to skip from the most recently requested line of instructions.

Pre-fetching may also be disabled in some embodiments of the invention. For example, if the configurable stride value 390 has a value of zero, then pre-fetching may not be used by the microprocessor. Disabling pre-fetching may be desirable when the instruction path of a set of instructions being executed by the core 310 jumps frequently or contain numerous loops.

Returning again to FIG. 4, in step 440, if the L1 cache control logic 360 determines that the current instruction is not stored within either the L1 cache 330 or the pre-fetch buffer 340, then the L1 cache control logic 360 issues an explicit request for the line of instructions containing the current instruction to the L2 cache 370. If the requested line of instructions is not stored within the L2 cache 370, then other components of the microprocessor 100 will search for the requested line of instructions in increasingly higher levels of memory until the current instruction is obtained. Once the requested line of instructions is obtained, the requested line of instructions will be stored within the L1 cache 330.

In addition, in step 440, the L1 cache control logic pre-fetches a line of instructions using the same technique as explained above in step 430. Thus, a pre-fetch request for a line of instructions is issued anytime that a requested instruction is not present within the L1 cache 330.

Embodiments of the invention monitor the pipeline of issued instruction requests to avoid duplication. To explain, assume that a pre-fetch request for a particular line of instructions was issued, and the pre-fetch request is outstanding (i.e., the particular line of instructions have not yet been stored in the pre-fetch buffer 340). If an instruction within the particular line of instructions is needed for processing by the core 310, the L1 cache control logic 360 will not issue an explicit request for the particular line of instructions, since the particular line of instructions are in the process of being obtained.

Similarly, in an embodiment, if (a) an explicit request for a particular line of instructions was issued, (b) the particular line of instructions have not yet been obtained, and (c) the L1 cache control logic 360 determines that a pre-fetch request for the particular line of instructions should be issued, then the L1 cache control logic 360 will not issue the pre-fetch request for the particular line of instructions since an explicit request for the particular line of instruction is currently being processed.

When a pre-fetch request for a line of instructions is propagated to higher levels of memory, the request remains a "pre-fetch request," unless an explicit request is issued for the line of instructions, as explained below. In other words, unless an explicit request is issued for a line of instructions which is currently in the process of being pre-fetched, if a pre-fetch request is issued for a particular line of instructions, and the particular line of instructions is ultimately stored in main memory 374, the request for the particular line of instructions remains a pre-fetch request even though multiple cache control logic components may be involved. Consequently, once the line of instructions is retrieved from memory, the line of instructions will be stored into the pre-fetch buffer 340, even though numerous cache control logic components, at one point or another, were involved in looking for the particular line of instructions.

As mentioned above, after a pre-fetch request has been issued for a particular line of instructions, an explicit request may be issued for the line of instructions being pre-fetched before the line of instructions is retrieved. In an embodiment, if a particular line of instructions is in the process of being pre-fetched, but has not yet been obtained, and if an instruction in the particular line of instructions is needed for processing by the core 310, instead of storing the particular line of instructions in the pre-fetch buffer 340 (as would normally be the case), the particular line of instructions will be stored in the L1 cache 330. In effect, the pre-fetch request is turned into an explicit request. In this way, the perceived latency of the request for the line of instructions is shorter than normal because the line of instructions were fetched (because they were pre-fetched) before they were needed (before an explicit request was issued for the line of instructions).

Adjusting the Configurable Stride Value

The configurable stride value may be adjusted to maximize the likelihood that a requested instruction, not present in the first level cache, is present in the pre-fetch buffer. The configurable stride value may be adjusted using a variety of mechanisms. In one embodiment, the configurable stride value may be manually adjusted. In such an embodiment, an administrator may use a software application to change the value of the configurable stride value. For example, the administrator may use a variety of tools to change the configurable stride value stored in a register of a microprocessor.

In another embodiment, the configurable stride value may be automatically adjusted without user intervention. For example, the configurable stride value may be dynamically adjusted based on a set of characteristics of the microprocessor that are being monitored. To illustrate, hardware counters on the microprocessor may monitor the activity of the components of a microprocessor for the occurrence of certain events, and increment a counter upon each occurrence of the event. Software programs may access those counters to monitor various characteristics of the microprocessor. Such software programs may store and apply rules for configuring the configurable stride value based, at least in part, upon the monitored characteristics of the microprocessor. In this way, the configurable stride value may be dynamically updated based on the current activity of the pre-fetch buffer. Several factors will be discussed below that may be used in manually or automatically adjusting the configurable stride value.

Considerations in Adjusting the Configurable Stride Value

When adjusting the configurable stride value, there are several factors that must be weighed. A first factor is spatial locality. Simply put, the greater the distance that a pre-fetched line of instructions is from the current instruction indicated by the PC, the less likely it is that the core will actually need the pre-fetched line of instructions. The weight to apply to this factor may depend upon the set of instructions that are being executed by the core. Some programs may have very linear execution patterns, which allow pre-fetching to be very successful, while other programs may contain a large number of loops or jumps, which mitigates the effectiveness of pre-fetching.

Another factor to consider is memory latency. The greatest benefit from pre-fetching instructions occurs when the pre-fetched line of instructions have been pre-fetched far enough in advance to have been stored in the pre-fetch buffer when the pre-fetched instructions are needed. Depending on the program instruction issue rate, to achieve this goal, the lines of instructions being pre-fetched may need to be several lines in advance of the most recently requested line of instructions, since a shorter pre-fetch stride may only fetch the line of instructions immediately before they would have been requested anyway, thereby resulting in a smaller efficiency enhancement.

In addition, any number of monitored characteristics of the microprocessor may be used to adjust or tune the configurable stride value. For example, one such monitored characteristic includes the number of instructions found within the pre-fetch buffer versus the number of instructions that are not found within the first level cache. If the number of instructions that are not found within the first level cache is high, and the number of instructions found within the pre-fetch buffer is low, then that indicates that the lines of instructions being stored within the pre-fetch buffer are not being requested. As a result, the pre-fetch stride may be too large, as the lines of instructions in the pre-fetch buffer are too speculative to be useful.

Another example of a monitored characteristic that may be used to tune the configurable stride value is the ratio of the number of instructions found within the pre-fetch buffer to the number of instructions installed into the pre-fetch buffer. If lines of instructions are being stored within the pre-fetch buffer, but instructions are not being found within the pre-fetch buffer, then the configurable stride value may be too large, as the instructions being pre-fetched are too speculative. Consequently, if this ratio is too high, then it may be prudent to reduce the size of the configurable stride value.

A further example of a monitored characteristic that may be used to tune the configurable stride value is the ratio of explicit requests for instructions that are currently in the process of being pre-fetched, but are not yet stored in the pre-fetch buffer 340. A large number of such explicit requests indicate that a larger stride value is required to allow for more time for the pre-fetched instructions to be returned and stored in the pre-fetch buffer 340.

Advantageously, since the L1 cache control logic 360 accesses the configurable stride value 390 each time that the L1 cache control logic 360 issues a pre-fetch request, once the configurable stride value 390 is updated, the L1 cache control logic 360 will immediately pre-fetch instructions using the updated configurable stride value 390.

Operating Without a Pre-Fetch Buffer

In the above description, pre-fetched lines of instructions, once retrieved from memory, have been described as being stored in a pre-fetch buffer. However, in other embodiments of the invention, once a pre-fetched line of instructions is retrieved from memory, the pre-fetched line of instructions may be stored in the L1 cache instead of the pre-fetch buffer. Such an embodiment would not need a pre-fetch buffer. Accordingly, a pre-fetch buffer is optional, and is not required by embodiments of the invention.

In embodiments of the invention that do not contain a pre-fetch buffer, pre-fetched lines of instructions may be stored in the L1 cache. Storing pre-fetched lines of instructions in the L1 cache may cause the cache-hit ratio to lower if instructions, which ultimately are needed in the future, are displaced in the L1 cache by pre-fetched lines of instructions that are never used.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method for retrieving instructions, comprising the steps of:
    monitoring characteristics of a pre-fetch buffer to determine whether to adjust a configurable stride value, wherein the pre-fetch buffer stores instructions that are anticipated to be requested in the future, wherein the characteristics of the pre-fetch buffer comprise:
        a number of hits to the pre-fetch buffer that are not hits to a first level cache;
        a ratio of hits to the pre-fetch buffer to lines of instructions installed in the pre-fetch buffer; and
        how many explicit requests for lines of instructions are currently being pre-fetched, but have not yet been retrieved from memory;
    in response to a determination to adjust the configurable stride value, determining whether to increase or decrease the configurable stride value based on the characteristics;
    receiving an indication that an instruction requested by an instruction execution component is not present in the first level cache, and wherein the instruction is in a first line of instructions;
    determining, based upon the configurable stride value, a subsequent line of instructions to retrieve, wherein the subsequent line of instructions is X lines of instructions after the first line of instruction, wherein X is an integer, and wherein the value of X depends upon the configurable stride value; and
    retrieving the subsequent line of instructions, wherein the subsequent line of instructions is retrieved in anticipation of being requested in the future.

2. The method of claim 1, wherein determining the subsequent line of instructions to retrieve comprises:
    accessing a register which stores the configurable stride value, wherein the configurable stride value indicates how many lines of instructions to skip from a current line of instructions.

3. The method of claim 1, further comprising:
    determining whether the instruction was present in the pre-fetch buffer.

4. The method of claim 1, further comprising:
    storing the subsequent line of instructions in the pre-fetch buffer.

5. The method of claim 1, further comprising:
    in response to determining that the monitored characteristics of the pre-fetch buffer indicate that the configurable stride value should be adjusted, adjusting the configurable stride value without receiving user input.

6. The method of claim 1, further comprising:
    in response to receiving user input, changing the value of the configurable stride value.

7. An apparatus for retrieving instructions, said apparatus configured to:
    monitor characteristics of a pre-fetch buffer to determine whether to adjust a configurable stride value, wherein the pre-fetch buffer stores instructions that are anticipated to be requested in the future, wherein the characteristics of the pre-fetch buffer comprise:
        a number of hits to the pre-fetch buffer that are not hits to a first level cache;
        a ratio of hits to the pre-fetch buffer to lines of instructions installed in the pre-fetch buffer; and
        how many explicit requests for lines of instructions are currently being pre-fetched, but have not yet been retrieved from memory;
    determine, in response to a determination to adjust the configurable stride value, whether to increase or decrease the configurable stride value based on the monitored characteristics,
    receive an indication that an instruction requested by an instruction execution component is not present in the first level cache, and wherein the instruction is in a first line of instructions;
    determine, based upon the configurable stride value, a subsequent line of instructions to retrieve, wherein the subsequent line of instructions is X lines of instructions after the first line of instruction, wherein X is an integer, and wherein the value of X depends upon the configurable stride value; and
    retrieve the subsequent line of instructions, wherein the subsequent line of instructions is retrieved in anticipation of being requested in the future.

8. The apparatus of claim 7, wherein to determine the subsequent line of instructions to retrieve said apparatus is further configured to:
    access a register which stores the configurable stride value, wherein the configurable stride value indicates how many lines of instructions to skip from a current line of instructions.

9. The apparatus of claim 7, wherein said apparatus is further configured to:
    determine whether the instruction was present in the pre-fetch buffer.

10. The apparatus of claim 7, wherein said apparatus is further configured to:

store the subsequent line of instructions in the pre-fetch buffer.

11. The apparatus of claim 7, wherein said apparatus is further configured to:

in response to determining that the monitored characteristics of the pre-fetch buffer indicate that the configurable stride value should be adjusted, adjust the configurable stride value without receiving user input.

12. The apparatus of claim 7, wherein said apparatus is further configured to:

in response to receiving user input, change the value of the configurable stride value.

* * * * *